United States Patent [19]

Boer et al.

[11] 4,100,439
[45] Jul. 11, 1978

[54] APPARATUS FOR COOLING THE END ZONES OF THE LAMINATION STACKS OF ELECTRIC MACHINES

[75] Inventors: Jöachim Boer; Georg Frankenhauser, both of Mulheim an der Ruhr, Germany

[73] Assignee: Kraftwerk Union Aktiengesellschaft, Mulheim an der Ruhr, Germany

[21] Appl. No.: 665,535

[22] Filed: Mar. 10, 1976

[30] Foreign Application Priority Data

Apr. 1, 1975 [DE] Fed. Rep. of Germany ....... 2514255

[51] Int. Cl.² .............................................. H02K 9/08
[52] U.S. Cl. ........................................ 310/57; 310/62; 310/260; 165/107
[58] Field of Search .................... 310/57, 64, 62, 58, 310/63, 59, 60, 65, 256, 260; 165/107

[56] References Cited

U.S. PATENT DOCUMENTS

| | | | |
|---|---|---|---|
| 2,707,243 | 4/1955 | Baudry | 310/57 |
| 2,707,244 | 4/1955 | Kilgore | 310/57 |
| 3,254,246 | 5/1966 | Philofsky | 310/57 |
| 3,497,737 | 2/1970 | Philofsky | 310/59 |
| 3,505,546 | 4/1970 | Victor | 310/57 |
| 3,739,208 | 6/1973 | Shartrand | 310/58 |
| 3,822,389 | 7/1974 | Kudlacik | 310/59 |

*Primary Examiner*—R. Skudy
*Attorney, Agent, or Firm*—Herbert L. Lerner

[57] ABSTRACT

Apparatus for cooling lamination stacks of electric machines comprising an enclosure for receiving cooling gas, the enclosure being disposable around a lamination stack and being formed with a plurality of gas inlet chambers, means for circulating cooling gas through the chambers and through a plurality of axially spaced cooling channels formed in the lamination stack, and an additional gas inlet chamber located at an end of the lamination stack for receiving the cooling gas in parallel with the plurality of chambers and for directing the cooling gas over the end of the lamination stack.

3 Claims, 3 Drawing Figures

APPARATUS FOR COOLING THE END ZONES OF THE LAMINATION STACKS OF ELECTRIC MACHINES

BACKGROUND OF THE INVENTION

The invention relates to apparatus for cooling the end zones of the lamination stacks of electric machines, particularly turbogenerators.

DESCRIPTION OF THE PRIOR ART

Presently known devices utilize concentric cooling-gas supply chambers which surround the stator lamination stack and are divided by radial partitions. Cooling gas is admitted through ventilators to the cooling chambers from the end spaces of the machine. The cooling gas flows radially inward through axially spaced lamination stack channels to the air gap. Such an apparatus is described in German Patent No. 948,714. In that apparatus, the cooling gas, which is first warmed up in the lamination stack or the stator winding, is admitted to a separate space containing the end laminations and the pressure plates of the stator lamination stack. The space is separated from the area of the coil head end connections. In high-performance turbogenerators, however, such a cooling arrangement of the end zones of the lamination stacks is not sufficient. Because of the substantial increase of the currents, further problems arise from the additional losses caused by the stray fluxes in the end laminations of the stator lamination stack and the pressure plates.

SUMMARY OF THE INVENTION

It is therefore an object of the invention of the instant application to achieve separate, intensive cooling of the end zones of the lamination stack, wherein the largest possible quantity of cooling gas is to be supplied to these zones without substantial lowering of the total pressure.

According to the invention, a solution of the stated problem is to provide a separate cooling gas distribution chamber in the area of the end zones of the lamination stack between the first cooling gas inlet chamber and the lamination stack. Cooling gas is admitted into the distribution chamber in parallel with the first cooling gas inlet chamber to supply at least the first lamination stack duct and the radial gaps between the pressure plate and the end lamination formed by the pressure fingers of the end laminations. In this connection, it is advantageous to arrange a partition having openings for the passage of cooling gas between the cooling gas distribution chamber and the radial gaps. It is thereby possible to adjust the input cross section area into the cooling gas distribution chamber and the passage cross section areas in the partition in accordance with the desired pressure distribution of the cooling gas.

With the foregoing and other objects in view, there is provided in accordance with the invention, apparatus for cooling lamination stacks of electrical machines comprising an enclosure for receiving cooling gas, the enclosure being disposable around a lamination stack and being formed with a plurality of gas inlet chambers, means for circulating cooling gas through the chambers and through a plurality of axially spaced cooling channels formed in the lamination stack, and an additional gas inlet chamber located at an end of the lamination stack for receiving the coling gas in parallel with the plurality of chambers and for directing the cooling gas over the end of the lamination stack.

In accordance with another feature of the apparatus of the invention, the plurality of gas inlet chambers are concentric with the lamination stack and include axially spaced radial partitions separating successive chambers, the additional gas inlet receiving the gas in parallel with the end chamber of the plurality of the chambers.

In accordance with a further feature of the apparatus of the invention, the electrical machine includes an axial rotor, the means for circulating cooling gas includes a blower mounted on the rotor adjacent the end of the lamination stack, and an air gap between the lamination stack and rotor, the gas being directed inwardly from the end chamber and through the channels to the air gap.

In accordance with an added feature of the apparatus of the invention, the lamination stack includes end channels, the additional gas inlet directing the gas through the end channels.

In accordance with an additional feature of the apparatus of the invention, an end plate is axially spaced from the end of the lamination stack, the cooling gas being directed through the space at the end of the lamination stack.

In accordance with a concomitant feature of the apparatus of the invention, an apertured partition is disposed between the additional gas inlet and the end space.

In accordance with a still further feature of the apparatus of the invention, the flow of cooling gas through the end channels is adjustable.

In accordance with yet another feature of the apparatus of the invention, the end channels and addtional gas inlet are disposed at each end of the lamination stack.

Other features which are considered as characteristic of the invention are set forth in the appended claims.

Although the invention is illustrated and described herein as embodied in an apparatus for cooling lamination stacks of electrical machines, it is nevertheless not intended to be limited to the details shown since various modifications may be made therein without departing from the spirit of the invention and within the scope and range of equivalents of the claims.

The invention, however, together with additional objects and advantages thereof will be best understood from the following description when read in connection with the accompanying drawings.

DESCRIPTION OF THE PREFERRED EMBODIMENT

Figure 1:
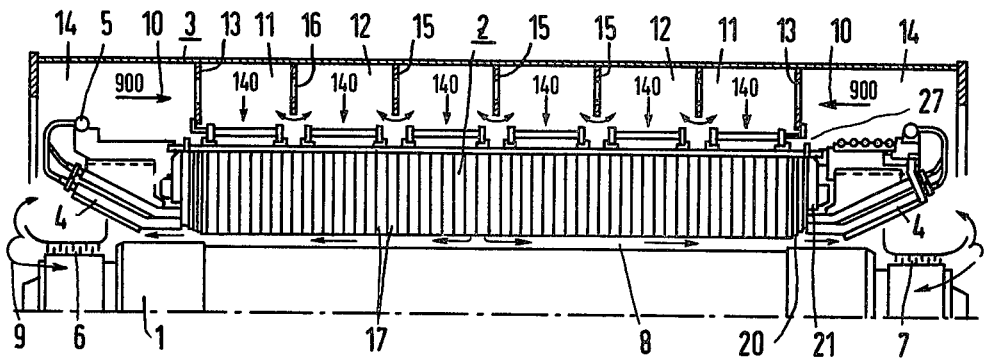
FIG. 1 is a diagrammatic view of a longitudinal cross section through the upper half of a turbogenerator with the corresponding cooling gas ducting.

As can be seen from FIG. 1, the rotor 1 and the stator lamination stack 2 of the turbogenerator are enclosed in a gastight housing 3, which is filled with hydrogen gas as the cooling gas. In this case the rotor 1 as well as the stator lamination stack 2 can be cooled by the hydrogen gas, while the stator windings 4 are connected to a water cooling loop 5. The cooling gas is suctioned out of the air gap 8 of the machine via blowers 6 and 7 mounted at the ends of the rotor 1. The gas is pumped axially outward, with the lower part of the stream, as indicated by the arrows 9, serving to cool the rotor, while the upper part of the stream, shown by arrows 10, is utilized for cooling the stator lamination stack 2.

The stator lamination stack 2 is concentrically surrounded by cooling gas inlet chambers 11 and 12, which are separated from each other by radial partitions 15 and from the end spaces 14 of the machine by partitions 13. The cooling gas from inlet chambers 11 and 12 is admitted through cutouts 16 in the partitions 13 and 15 and flows radially inward via ducts 17 in the lamination stack 2 to the air gap 8 and thus cools the stator laminations. The pressure distribution can be seen by the numbers above the cooling gas arrows, which indicate the respective cooling gas pressure as measured in millimeters of a column of water. Thus, for instance, there is a cooling gas pressure of 900 mm in the end spaces 14 which at the same time is also the input pressure for the cooling of the rotor, while the pressure in the individual cooling gas inlet chambers 11 and 12 is reduced to 140 mm.

Because of the substantial increase of the electrical currents in modern high-performance machines, there is also an increase in the additional losses in the end laminations 20 and the pressure plates 21 of the lamination stack 2, caused by the stray fluxes. As a result, the end areas must be cooled particularly intensively. For this purpose, for example, an increased pressure and larger quantity of cooling gas can be supplied to the cooling gas inlet chambers 11 at the end faces. This, however, would result in an excessive overall pressure drop and in unnecessary cooling of too many lamination stack ducts.

Figure 2:
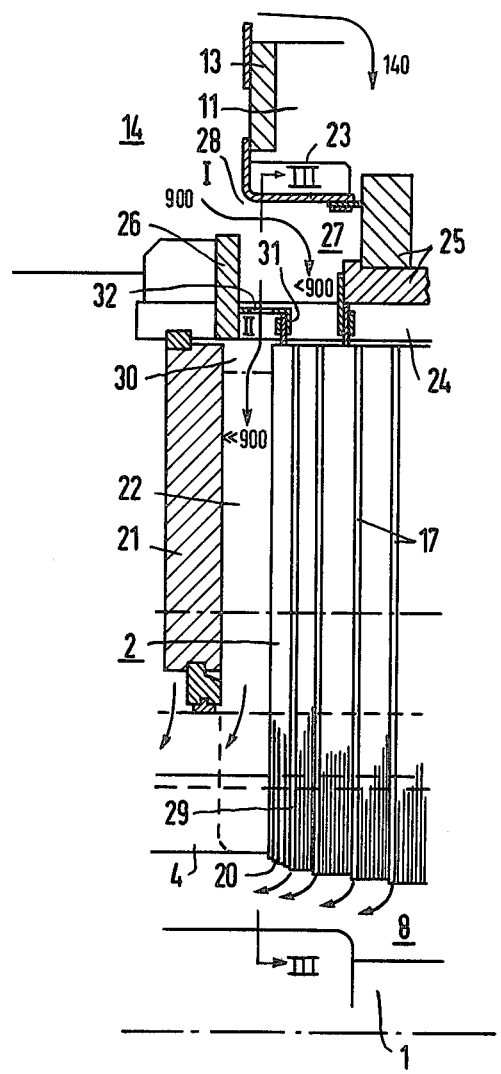
FIG. 2 is an enlarged view of a portion of the turbogenerator of FIG. 1 in the area of an end zone of a lamination stack.
Figure 3:
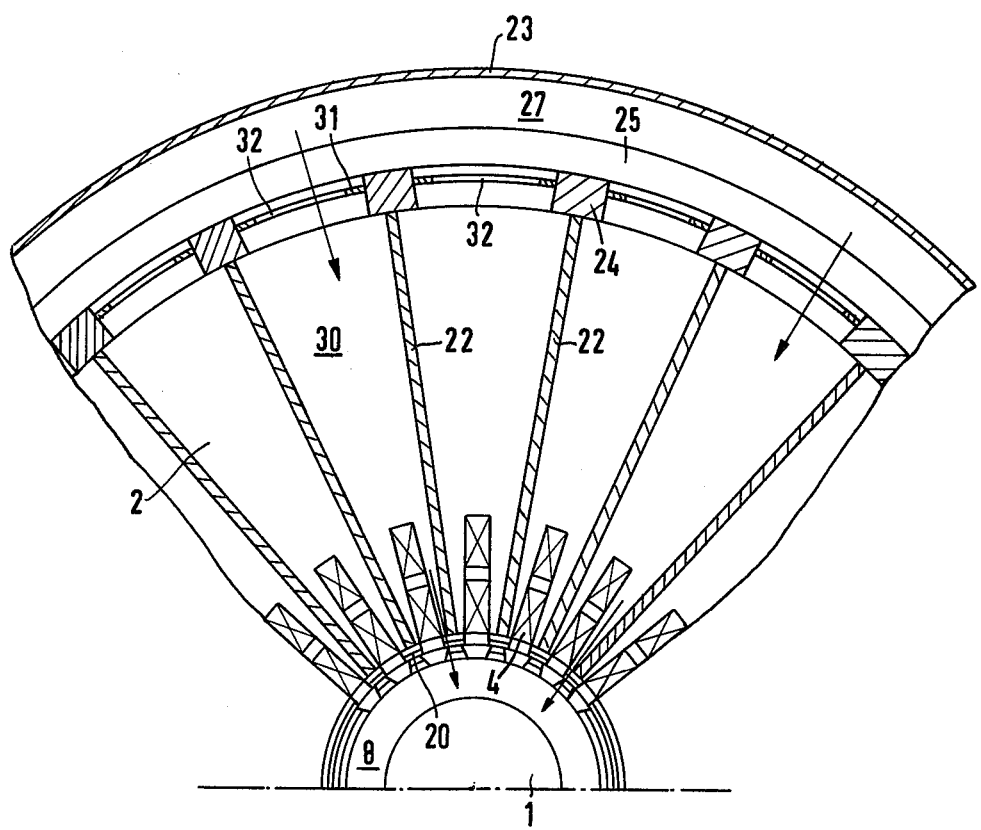
FIG. 3 is a diagrammatic cross-sectional view of FIG. 2, taken along the line III—III in the direction of the arrows.

According to the present invention, as can be seen more clearly in the enlarged view of the lamination stack end zones shown in FIG. 2 and FIG. 3, only the end zones of the lamination stack are cooled separately. This end zone consists substantially of the end laminations 20, the radial pressure fingers 22 and the end plate 21, which clamp the entire lamination stack in a fixed axial position. In this case, the end wall 13 of the cooling gas inlet chamber 11 at the end face is not brought down to the lamination stack 2, but is now positioned between the inlet chamber 11 and the lamination stack 2. This provides a separate cooling gas distribution chamber 27, which is defined by a ring wall 23 and rings 25 and 26 supported on the longitudinal beams 24 of the lamination stack. Cooling gas is thus admitted in parallel with the cooling gas inlet chamber 11 via the open ring gap 28 between the ring wall 23 and the ring 26. This cooling gas distribution chamber 27 can then supply cooling gas to at least the first cooling channel 29 of the end lamination 20, as well as the radial channels 30 defined by the pressure plates 21 and the end laminations 20. In this case, it is advantageous to arrange a separate partition 31 having cooling gas passage openings 32 between the cooling gas distribution chamber 27 and the radial ducts 30.

The cooling gas flow through the cooling ducts 29 and the radial ducts 30 can thus be adjusted for throttled by varying the cross sections of the ring gap 28 and of the cooling gas passage openings 32, according to the degree of cooling required. This may be achieved in any suitable manner such as by an adjustable valve or cover plate. As the indicated pressure values show, with a pressure of 900 mm in end space 14, the pressure in the cooling gas distribution chamber 27 is smaller than 900 mm, as a result of appropriate throttling in the ring gap 28. Further adjustment via the cooling gas passage openings 32 permits only a small amount of cooling gas with a pressure far below 900 mm to flow through the radial gaps 30.

The described arrangement of separate cooling gas chambers, thus provides a simplified system for supplying the largest available amount of cooling gas to the pressure plates and the end laminations without any substantial drop in the overall pressure.

There are claimed:

1. In an electrical machine having stator lamination stacks surrounding and spaced from a rotor, the stacks and the rotor defining a machine gap therebetween, radial pressure fingers engaging respective end laminations of the stacks, respective pressure plates clamping the pressure fingers and the stator lamination stacks therebetween, a housing having a space therein surrounding the stator lamination stacks, radial partitions spaced-apart in axial direction of the housing and subdividing the housing space into respective end spaces and a plurality of cooling-gas inlet chambers intermediate thereto, radial channels provided in the stator lamination stacks and connecting the cooling-gas inlet chambers to the machine gap, and blower means for producing a cooling-gas flow from the end spaces, wherein maximum blower pressure prevails, axially through the cooling-gas inlet chambers, radially inwardly through the radial channels and axially outwardly through the machine gap, a device for intensively cooling the end zones of the stator lamination stacks comprising, in vincinity of the end zones of the stator lamination stacks, a cooling-gas distributor chamber separated from the cooling-gas inlet chambers and disposed concentrically to and between the cooling-gas inlet chambers and the stator lamination stacks, said cooling-gas distributor chambers being connected, in parallel with the cooling-gas inlet chambers, to the end spaces, respectively, and to the machine gap, said parallel connection including additional radial channels defined by the respective pressure fingers, the respective pressure plates and the respective end laminations of the stacks and communicating with said cooling-gas distributor chambers so as to receive therein coolant gas for intensely cooling the end laminations directly from the end spaces wherein the maximum blower pressure prevails.

2. Device for intensely cooling the end zones of the stator lamination stacks according to claim 1 including separator plates disposed between said cooling-gas distributor chambers and said additional radial channels, said separator plates being formed with respective flow-through openings adjustable in size so as to vary the flow of coolant gas from said distributor chambers thereof to said additional radial channels.

3. Device for intensely cooling the end zones of the stator lamination stacks according to claim 2 wherein the connection between said cooling-gas distributor chambers and the respective end spaces has an inlet cross section in the form of a ring gap and being adjustable in accordance with the pressure-distribution requirement of the cooling gas.

* * * * *